Jan. 12, 1926.
J. E. JENKINS
MOTOR VEHICLE
Filed Oct. 13, 1924
1,569,808
2 Sheets—Sheet 1
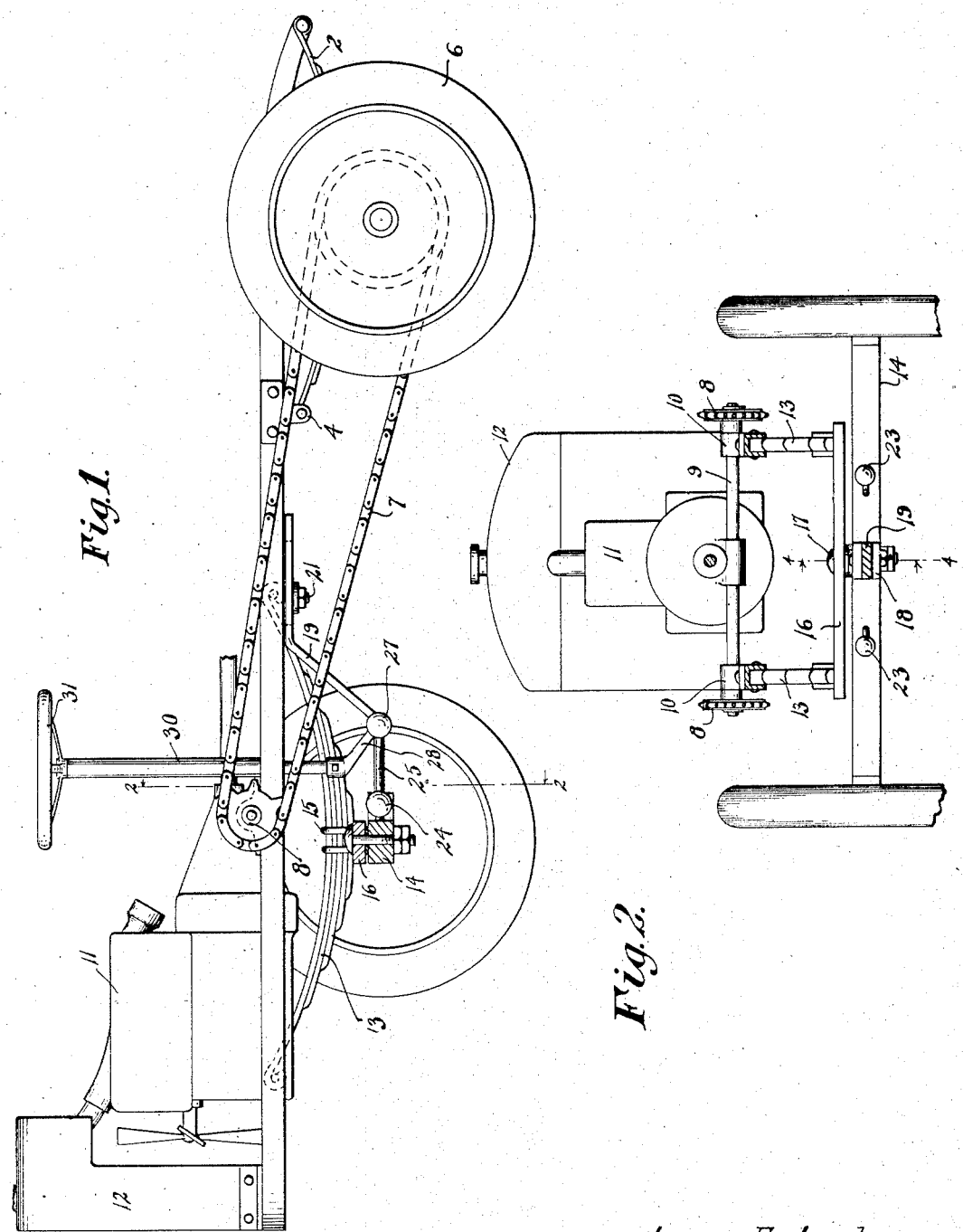
James E. Jenkins.
INVENTOR
BY Victor J. Evans.
ATTORNEY
WITNESS:

Jan. 12, 1926.  
J. E. JENKINS  
MOTOR VEHICLE  
Filed Oct. 13, 1924
1,569,808
2 Sheets-Sheet 2
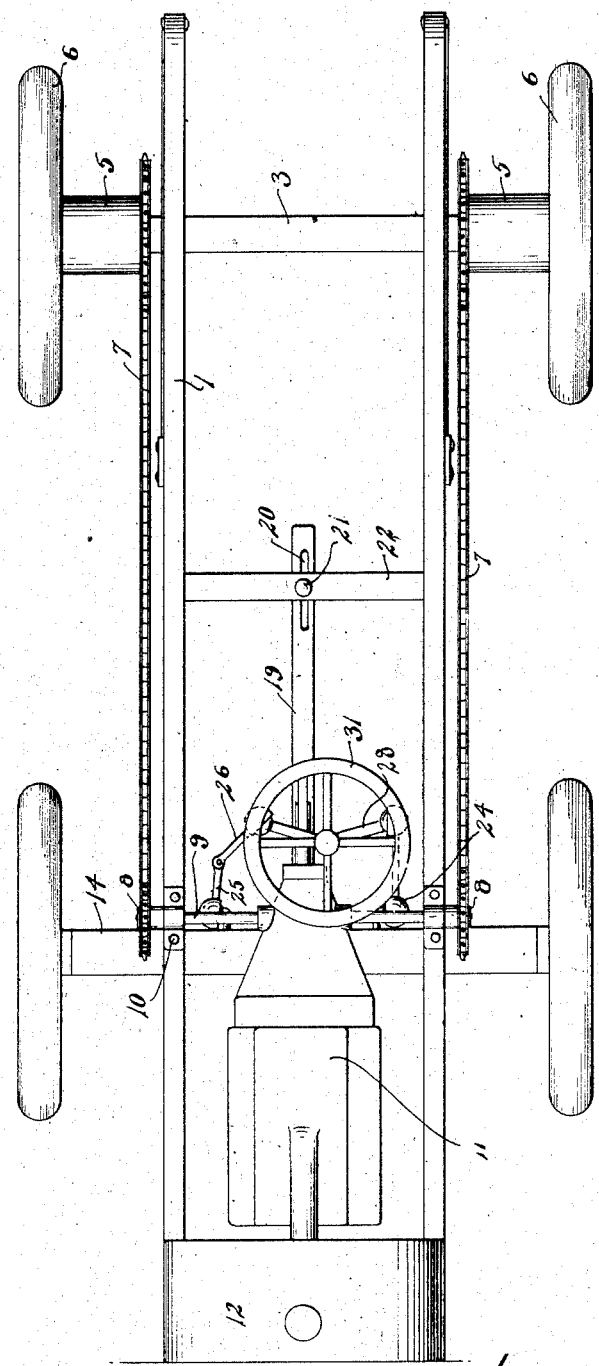
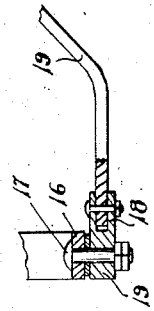
James E. Jenkins.
INVENTOR
BY Victor J. Evans.
ATTORNEY
WITNESS:

Patented Jan. 12, 1926.

1,569,808

UNITED STATES PATENT OFFICE.

JAMES E. JENKINS, OF HIGHLAND PARK, MICHIGAN.

MOTOR VEHICLE.

Application filed October 13, 1924. Serial No. 743,414.

*To all whom it may concern:*

Be it known that I, JAMES E. JENKINS, a citizen of the United States, residing at Highland Park, in the county of Wayne and State of Michigan, have invented new and useful Improvements in Motor Vehicles, of which the following is a specification.

My present invention has reference to motor truck construction.

An object is to construct a truck whereby the body thereof will be more effectively supported than is the body of an ordinary truck.

A further object is the construction of a truck frame wherein the steering wheels are mounted to the rear of the motor and whereby the truck can make a shorter turn than that of the ordinary construction.

The invention further resides in the construction, combination and operative association of parts such as is disclosed by the drawings which accompany and which form part of this application.

In the drawings:—

Figure 1 is a side elevation of the improvement with parts in section.

Figure 2 is a sectional view approximately on the line 2—2 of Figure 1.

Figure 3 is a top plan view of the improvement.

Figure 4 is a fragmentary sectional view approximately on the line 4—4 of Figure 2.

My truck frame construction includes the usual channeled side members or sills 1 connected together at desired intervals and having their rear ends downwardly arched. To the arched ends of the sills there are connected one end of semi-elliptical springs 2 on which the rear axle 3 is supported. The inner ends of the springs 2 are connected to suitable shackles 4 which depend from the sills 1. The rear axle is straight and is not provided with the usual differential housing. Mounted on the spindles of the axle 3 there are the inwardly directed hubs 5 for the drive wheels 6. The hubs carry on their inner ends sprockets around which are trained endless chains 7, the said chains being also trained around smaller sprockets 8 journaled on a shaft 9 mounted in bearings 10 on the sills at a suitable distance inward with respect to the forward end of the frame. The shaft 9 is revolved by intermeshing gears or similar means operated by the motor 11 of the improvement. The motor is suitably supported and the radiator 12 therefor is mounted on the front of the frame. Suitably connected by shackles or the like to the under face of the sills 1 there are semi-elliptical springs 13 that support the front axle 14.

By reference to the drawings it will be noted that the front axle 14 is mounted below the shaft 9, and consequently at a suitable distance from the front end of the frame. The downwardly arched central portions of the springs 13 are connected by means 15, to a plate 16. The plate is connected by a king bolt 17 to the front axle 14. Preferably there are arranged between the axle 14 and the plate 16 disks which form a fifth wheel.

The front axle 14, at the center thereof, has rearwardly extending lugs 18 between which is pivoted a bar 19. The bar has its rear end upwardly inclined and from thence straight, the said straightened portion being provided with an elongated slot 20 through which passes a guide pin 21 arranged on one of the cross beams 22 that connects the sills to the frame. The bar 19 serves as a stabilizing element for the axle 14.

On its rear face, the axle 14, at equidistance from the ears 18, is provided with offset spherical heads 23 over which are arranged cup members 24. Each of the cup members has a rearwardly extending arm 25, and to each of the arms there is pivotally connected a link 26. The links 26 also terminate in ball heads which are engaged by cup members 27 formed on the ends of angle arms 28 which are upwardly extended and which terminate in a socket member 29 in which the steering post 30 is secured. The steering post is provided with the usual steering wheel 31.

The improvement provides a direct drive and dispenses with a great number of parts usually employed in truck constructions. Control means are provided for the engine, but as the same may be of any class, their illustration is not deemed necessary.

Having described the invention, I claim:—

A motor truck construction in which the axles for the drive and for the steering wheels are supported from semi-elliptical springs connected to the sills of the truck frame and in which the rear wheels are chain driven by the engine, a plate supported by the front springs and to which the front axle is pivoted, arms having a ball and socket connection with the front axle, links pivoted to the arms, an angle member having a ball and socket connection with the links, a steering post connected centrally with the angle member, and a stabilizing bar pivotally secured to the front axle and slidably connected to the frame.

In testimony whereof I affix my signature.

his
(X) JAMES E. JENKINS.
mark